United States Patent Office 3,006,697
Patented Oct. 31, 1961

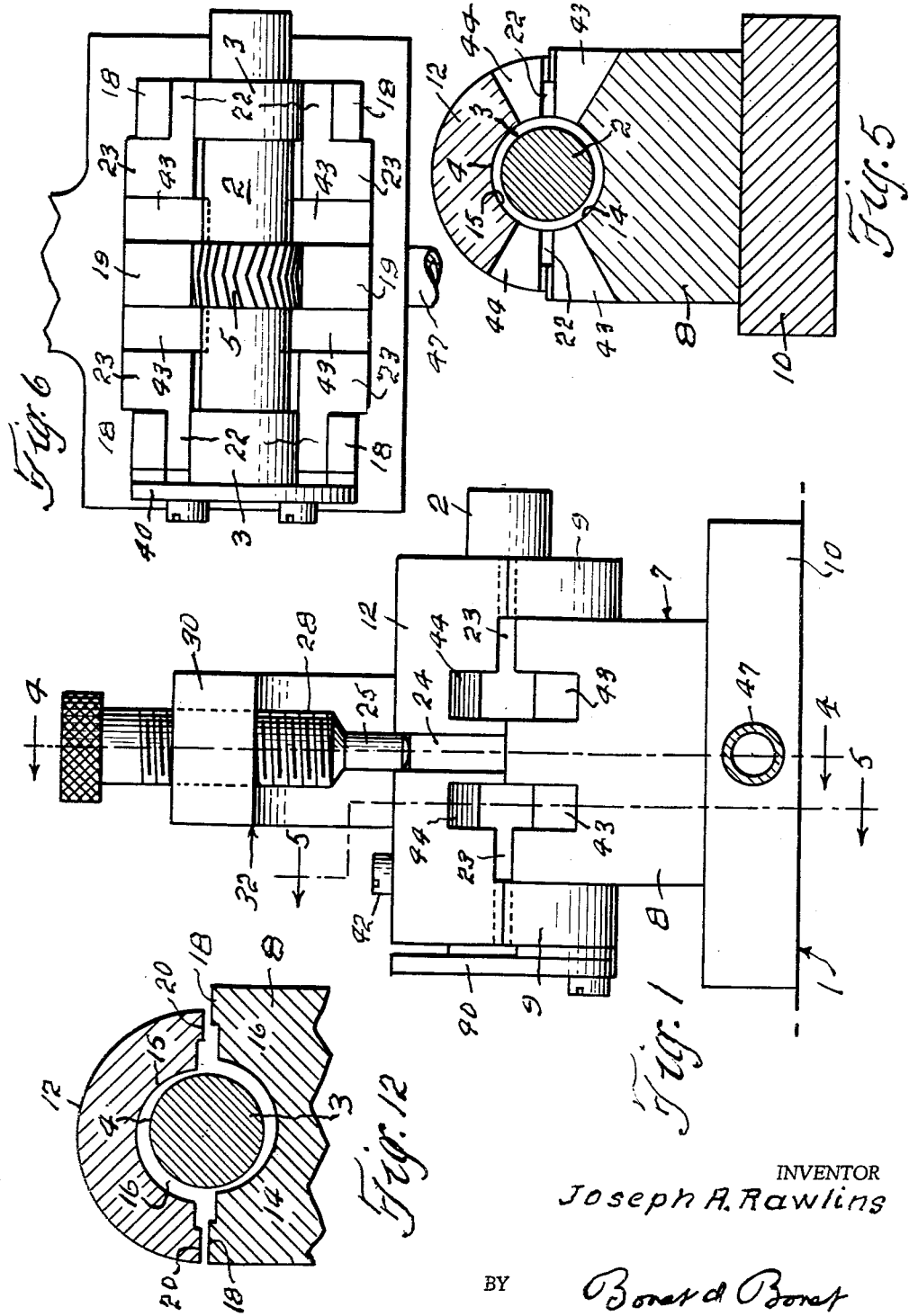

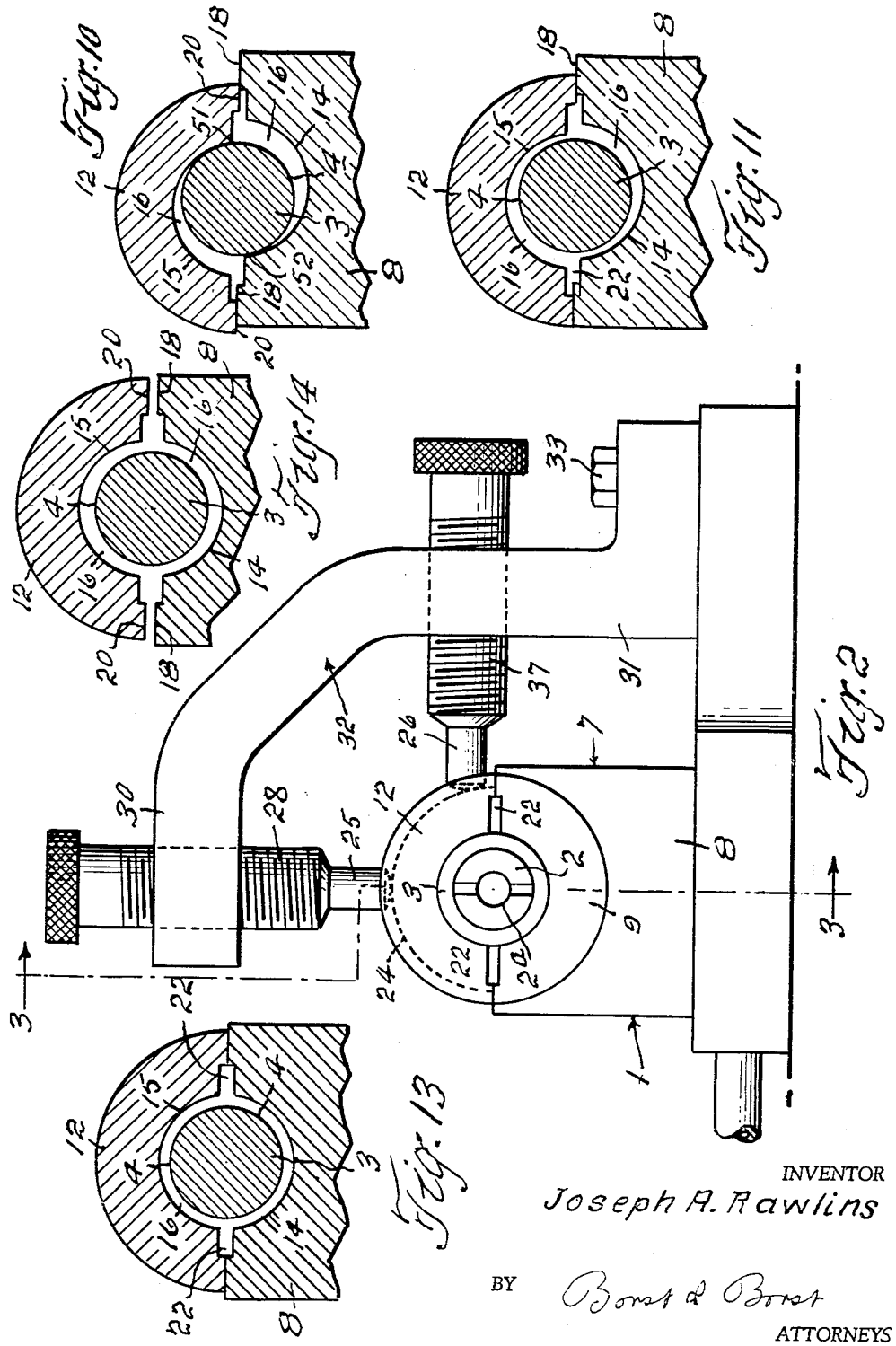

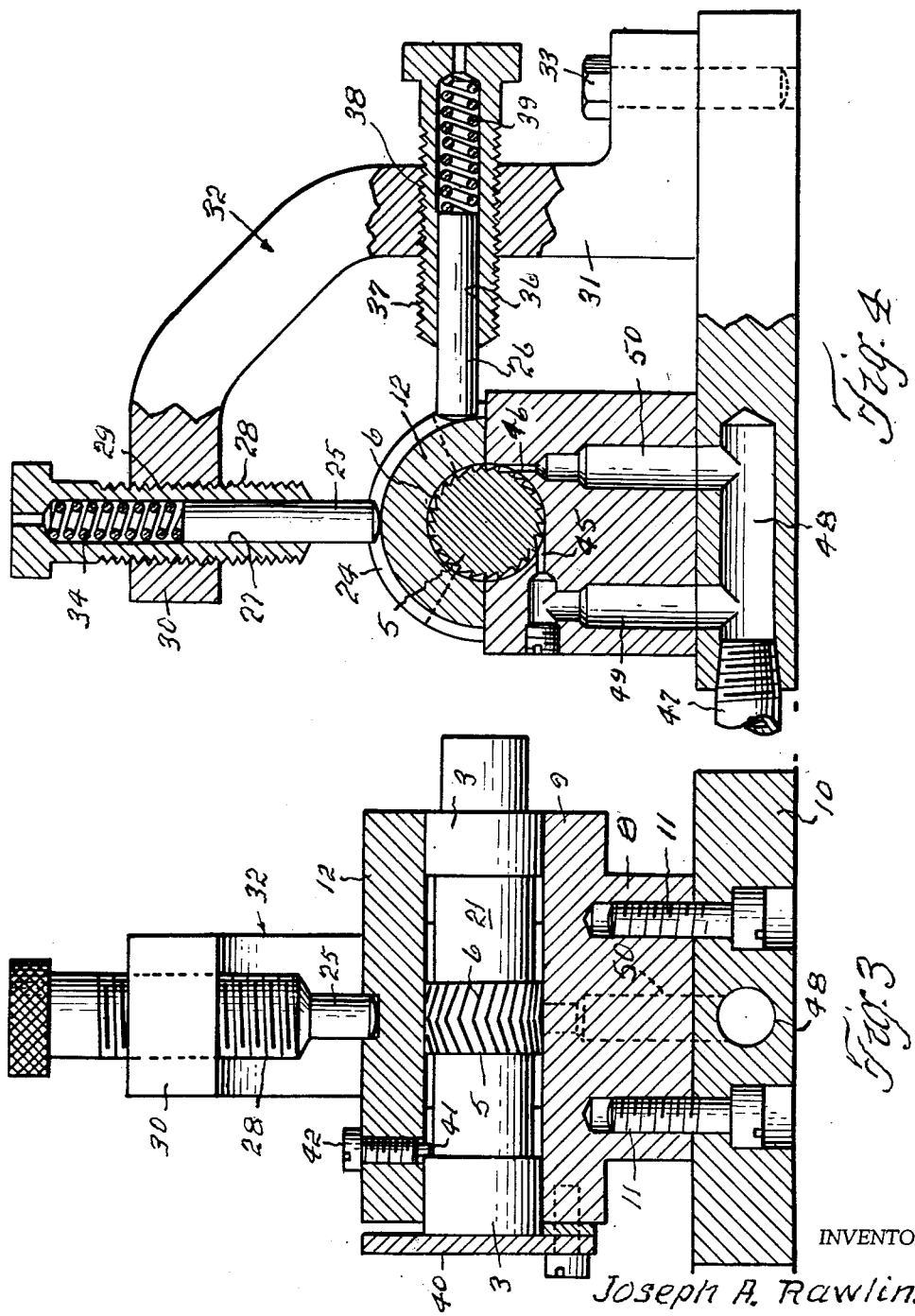

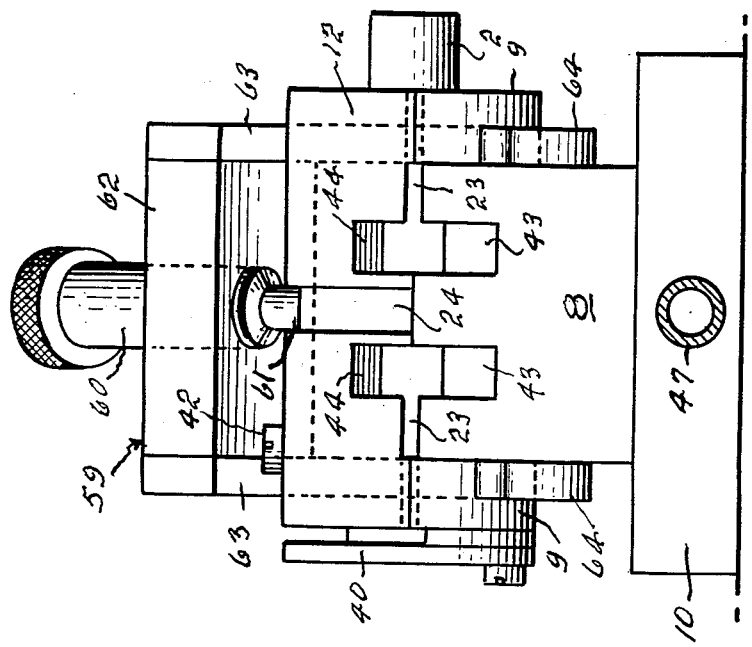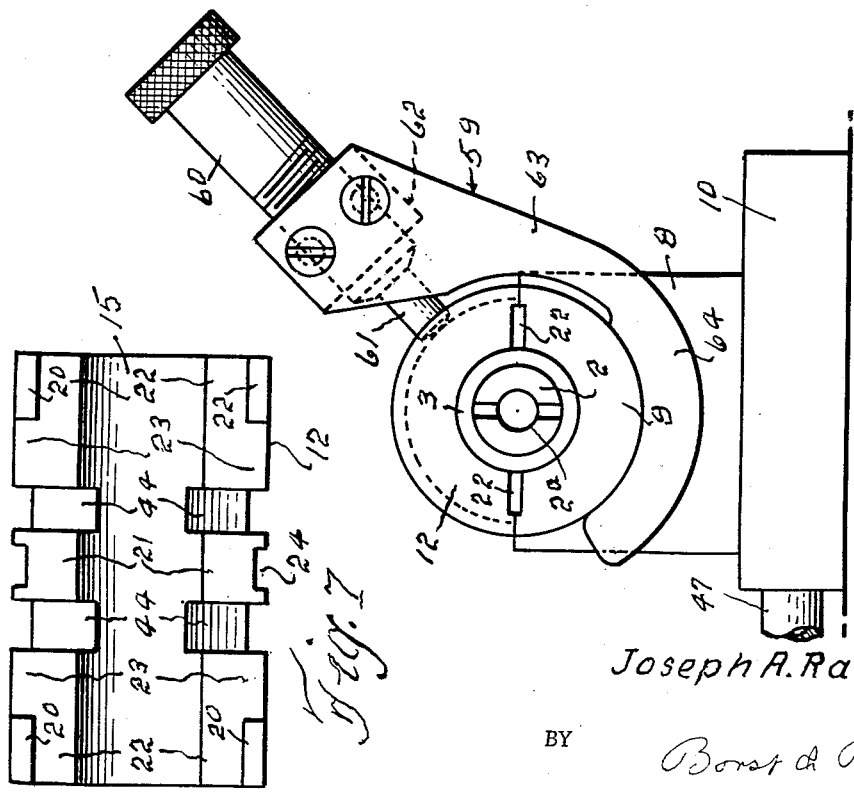

3,006,697
GAS LUBRICATED BEARING
Joseph A. Rawlins, Tenafly, N.J., assignor to Sperry Rand Corporation, Ford Instrument Company Division, Wilmington, Del., a corporation of Delaware
Filed Dec. 19, 1960, Ser. No. 76,534
3 Claims. (Cl. 308—9)

This invention relates to what are generally known as air bearings in which a shaft or spindle is rapidly rotated in and lubricated by a thin film of air which is interposed between the shaft and a bearing housing therefor.

Air bearings are of two types, the hydrostatic type in which air under pressure is forced into the bearing housing around the shaft or spindle, and the hydrodynamic type in which the air pressure around the spindle within the bearing housing is developed by the rapid rotation of the shaft or spindle. Air bearings, both the hydrostatic and hydrodynamic type, are particularly applicable to the spindles for microtomes, small high speed gyroscopes, and other ultra-high-speed devices. The present invention relates to air bearings of the dynamic type and is a modification and improvement of the air bearing disclosed in U.S. Patent No. 2,511,543 which was issued in my name on June 13, 1950.

It has been found that air bearings, prior to the present invention, had a tendency to seize or bind after a spindle supported thereby had been rotated at high speed for an extended period of time. This may be due to fine particles which are drawn in with the air becoming wedged between the bearing surfaces, to expansion of parts due to increases in temperature, or to other causes. This tendency was partially corrected by the construction shown in the aforesaid Patent No. 2,511,543.

The present invention permits spindle speed in excess of 500,000 r.p.m. for extended periods of time. A compressed air turbine constructed exactly as shown and described herein, but approximately half the size of the drawing, was repeatedly operated for long intervals at speeds of 500,000 r.p.m. without binding or seizing or any appreciable increase in temperature. During one test using approximately 70 lbs. per square inch air pressure a speed of 517,000 r.p.m. was attained. In accordance with the invention the bearing housing comprises a base section which is mounted in fixed position, and a complementary cap section which is mounted on the base section for vertical and transverse floating movement, but not longitudinal movement, with respect thereto. The two sections are provided with opposed similar semicircular bearing surfaces in which the cylindrical bearing surface of the spindle is journalled. The radii of the opposed bearing surfaces in base and cap sections of the bearing housing are the same and are slightly greater than the radius of the spindle bearing surface. For example, for a cylindrical spindle bearing surface having a .250" radius, semicylindrical opposed housing bearing surfaces each having a radius of approximately .251" are provided. Therefore when the two semi-circular housing bearing surfaces and the cylindrical spindle bearing surface are all concentric there will be a radial clearance of approximately .001" between the spindle and housing bearing surfaces. Spring means are provided by which the bearing cap is yieldingly biased both downwardly and transversely with respect to the spindle and base section. When the turbine is not in use one side of the bearing surface in the base section and the opposite side of the bearing surface in the cap section are yieldingly held in contact with the spindle bearing surface. As the spindle is rotated air is drawn into and compressed in the clearance space between spindle and housing bearing surfaces. The faster the spindle is rotated the greater the amount of air drawn into and the higher the pressure developed in the clearance space between spindle and housing bearing surfaces. As the pressure in the clearing space increases the bearing cap is shifted against the yieldable spring means. The greater the pressure the greater the shifting of the bearing cap. This shifting may be either vertical or transverse, or the cap may be simultaneously shifted both vertically and transversely. As the cap is shifted the spindle automatically centers itself with respect to the two opposed housing bearing surfaces. It will therefore be seen that during operation the spindle is supported by and rotated in a thin film of air which provides the only lubrication for the bearing and acts as a coolant therefor.

The principal object of the invention is to provide a bearing for an ultrahigh-speed spindle in which friction is reduced to a minimum.

Another object of the invention is to provide an air bearing in which shafts may be rotated at ultrahigh-speeds in order of 500,000 r.p.m. without binding or seizing.

Another object of the invention is to provide a bearing of the aforesaid character which is efficient in operation, of simple construction, is long-lived, and is inexpensive to manufacture and maintain.

Having stated the principal objects of the invention, other and more limited objects thereof will be apparent from the following specification and the accompanying drawings forming a part thereof in which:

FIG. 1 is a front elevation of a compressed air turbine which is provided with a pair of air bearings, constructed according to my invention, in which the turbine rotor shaft is mounted;

FIG. 2 is an end elevation of the turbine shown in FIG. 1, looking from the right of FIG. 1;

FIG. 3 is a central longitudinal section taken substantially on the line 3—3 of FIG. 2;

FIG. 4 is a transverse section taken on the line 4—4 of FIG. 1;

FIG. 5 is a transverse section taken on the line 5—5 of FIG. 1;

FIG. 6 is a top plan view of the fixed stationary bearing block;

FIG. 7 is a bottom plan view of the floating bearing cap;

FIG. 8 is a view similar to FIG. 1 showing a slightly modified form of the invention;

FIG. 9 is an end elevation of the form of the invention shown in FIG. 8 looking from the right of FIG. 8; and FIGS. 10 to 14 inclusive are fragmentary diagrammatic sectional views illustrating the action and position of the floating bearing cap during various different speeds of the rotor shaft, certain parts thereof being drawn to a greatly exaggerated scale for the purposes of illustration.

The construction and operation of the invention will now be described in detail with the use of reference characters, reference being had first to FIGS. 1 to 7 of the drawing. The invention is shown as applied to a compressed air turbine 1 having a rotor shaft 2 which is provided with a pair of similar enlarged longitudinally spaced journals 3, having similar smooth cylindrical bearing surfaces 4. The shaft 2 is also provided with a rotor 5, which is disposed intermediate the journals 3 and is provided with driving vanes 6 about the periphery thereof. One end of the shaft 2 which extends out from one end of the turbine 1 is provided with any suitable means 2$^a$ by which a tool or other device to be driven by the turbine may be detachably connected to the rotor shaft 2. The rotor shaft assembly 2 to 6 is suitably mounted in a journal box 7 which comprises a stationary bearing block 8, which includes a pair of semicircular integral extensions 9 one at each end thereof, and is secured in fixed position to a base plate 10 by machine screws 11. A bearing cap 12 is suitably mounted upon the bearing block 8 for vertical and transverse, but not longitudinal, floating movement, as will be hereinafter explained. The top of the bearing block 8 is provided with a centrally disposed semicircular bearing surface 14 which extends from end to end of the block, including the semicircular extensions 9 at each end thereof; and the bottom of the bearing cap 12 is provided with a centrally disposed semicircular bearing surface 15 which extends from end to end thereof and is similar to and opposed to the semicircular bearing surface 14 in the block 8. The radii of the bearing surfaces 14 and 15, which are the same, are slightly greater than the radius of the bearing surfaces 4 of the journals 3. For example, in the drawings hereof, which are double the size of the turbine from which they were made, the radius of the journal bearing surfaces 4 is .250" and the radius of the opposing bearing surfaces 14 and 15 in the bearing block 8 and the bearing cap 12 is .251". When the bearing block 8 and the bearing cap 12 are in juxtaposition the bearing surfaces 14 and 15 provide bearings for the journals 3; and when the bearing surfaces 4, 14 and 15 are all concentric, as diagrammatically shown in FIG. 13, there is a uniform annular clearance 16 of .001" between the journal bearing surfaces 4 and the block and cap bearing surfaces 14 and 15.

The upper surface of the bearing block 8 is provided with upwardly extending pads 18 at each end thereof and centrally disposed pads 19, the smooth ground upper surfaces thereof all being disposed in the same plane; and the under surface of the bearing cap 12 is provided with downwardly extending pads 20 at each end thereof, and centrally disposed pads 21, the smooth ground lower surfaces thereof all being in the same plane. The downwardly extending pads 20 and 21, which are similar to and opposed to the upwardly extending pads 18 and 19 cooperate with the pads 18 and 19 to position the cap 12 upon the block 8 and to provide passageways 22 and 23 at the ends and sides of the block 8 and cap 12 respectively through which air may be drawn into or expelled from the clearance space 16 about the bearing surface 4. The axis of the semicircular bearing surface 14 in the bearing block 8 is disposed in the plane of the upper surfaces of the pads 18 and 19, and the axis of the bearing surface 15 in the bearing cap 12 is disposed in the plane of the lower surfaces of the pads 20 and 21.

The bearing cap 12 is provided with a semicircular groove 24 which is disposed in the outer surface of the bearing cap 12 intermediate the ends thereof, and into which vertically and horizontally disposed spring pressed plungers 25 and 26 respectively extend. The plunger 25 is slidably mounted in the bore 27 of an externally threaded sleeve 28 which is adjustably secured in a threaded aperture 29 in the horizontal section 30 which is integral with the vertical section 31 of a bracket 32 which is removably secured to the base plate 10 by a bolt 33. The plunger 25 is yieldingly pressed vertically downwardly against the bearing cap 12 in the groove 24 by a spring 34 which is disposed in the bore 27 above the plunger 25. The plunger 26 is slidably mounted in the bore 36 of an externally threaded sleeve 37 which is adjustably secured in a threaded aperture 38 in the vertical section 31 of the bracket 32. The plunger 26 is yieldingly pressed horizontally outwardly against the bearing cap 12 in the groove 24 by a spring 39 which is disposed in the bore 36 behind the plunger 26. It will therefore be seen that the bearing cap 12 is yieldingly biased vertically downwardly and horizontally transversely outwardly with respect to the bearing block 8 and the rotor shaft 2. The bearing cap 12 is constrained against longitudinal movement with respect to the bearing block 8 by the engagement of the plunger 25 in the groove 24; and the rotor shaft 2 is constrained against longitudinal movement with respect to the bearing housing 7 by an end cap 40 which is removably secured to the block 8 in engagement with the outer end of one of the journals 3, and a dowel pin 41 which engages the opposite side of the said journal 3 and is integral with the lower end of a screw 42 carried by the bearing cap 12.

Each side of the bearing block 8 is provided with downwardly and outwardly flaring passageways 43, adjacent each side of the rotor 5 which extend from the bearing surface 14 to the outer sides of the bearing block 8; and the bearing cap 12 is provided with upwardly and outwardly flaring passageways 44 which extend from the bearing surface 15 to the outer surface of the cap 12 in opposed registration with the passageways 43 in the block 8.

The rotor 5 and rotor shaft 2 are driven by jets of compressed air which are applied to the driving vanes 6 of the rotor through a pair of nozzles 45 and 46 in the block 8 which are disposed at right angles to each other tangent to the rotor 5. Compressed air is supplied to the nozzles 45 and 46 from a suitable source of compressed air (not shown) through a pipe 47, passageway 48 in the base plate 10, and pasasgeways 49 and 50 in the block 8 which communicate at the lower ends thereof with the passageway 48 and at the upper ends thereof with the nozzles 45 and 46. The propelling air from the nozzles 45 and 46 is exhausted through the passageways or exhaust ports 43—44 after leaving the vanes 6.

The movement of the bearing cap 12 to increase or decrease the clearance 16 between the journal bearing surfaces 4 and the block and cap bearing surfaces 14 and 15 in accordance with varying speeds of rotation of the rotor shaft assembly 2–6 during operation will now be explained in connection with the diagrammatic views 10 to 14, which as previously stated are drawn to a greatly exaggerated scale with respect to the clearance between bearing surfaces for the purpose of illustration. FIG. 10 shows the relative positions of the bearing block 8, bearing cap 12 and journals 3 on the rotor shaft 2 when the shaft 2 is stationary during periods of non-use. As shown therein the spring pressed plunger 25 is yieldingly holding the cap 12 in its lowermost vertical position with the pads 20 thereof in contact with the pads 18 on the block 8. At the same time the spring pressed plunger 26 is yieldingly holding the cap 12 at the limit of its transverse movement in one direction with the edge 51 of the bearing surface 15 in contact with one side of the bearing surface 4 and the diametrically opposite edge 52 of the bearing surface 14 in engagement with the opposite side of the bearing surface 4. It will therefore be seen that when the shaft 2 is not rotating there is no clearance about the journal bearing surfaces 4 along the edges 51 and 52. FIG. 11 shows the relative position of the block 8, cap 12 and shaft journals 3 when the shaft 2 is being rotated at a relatively low speed as compared to the ultrahigh-speed at which the shaft 2 is capable of being operated. At this speed the pressure of the air within the clearance space 16 which is being drawn thereinto by the rotation of the shaft 2 has forced the cap 12 transversely, against the yieldable pressure of the plunger 26, from the position shown in FIG. 10 to the position shown in FIG. 11, while the plunger 25 is still maintaining the cap 12 in its lowermost position with the pads 20 thereof in contact with the pads 18 on the block 8. This moves the edges 51 and 52 out of engagement with the bearing surface 4 thus providing a slight clearance at these points between the bearing surface 4 and the bearing surfaces 14 and 15. As the speed of the shaft 2 progressively increases the pressure of the air within clearance space 16 may move the bearing cap 12 from the position shown in FIG. 11 to the position shown in FIG. 13 and then to the position shown in FIG. 14; or the air pressure may move the cap 12 from the position shown in FIG. 11 to the position shown in FIG. 12 and then to the position shown in FIG. 14. As previously stated, and as shown in FIGS. 10 to 14, the shaft 2 always automatically centers itself with respect to the bearing surfaces 14 and 15, as the air pressure shifts the cap 12 from one position to another. From this it will be seen that the clearance between the bearing surfaces 4 on the shaft journals 3 and the bearing surfaces 14 and 15 in the block 8 and cap 12 increases as the speed of the shaft 2 increases so that any foreign particles entrained in the air will pass out from between the bearing surfaces and eliminate any tendency to bind or seize. It will also be apparent that the shaft 2 rotates within an annular film of air which constitutes the only lubricant for the bearings and acts as a coolant which prevents any undue rise in the temperature of the parts such as would tend to cause binding or seizing. As previously stated with the construction shown and described herein the rotor shaft 2 has been driven for extended periods of time at speeds in excess of 500,000 r.p.m. without binding or seizing.

In FIGS. 8 and 9 I have shown a slightly modified pressure means 59 for yieldingly biasing the bearing cap 12 vertically and transversely with respect to the bearing block 8 and rotor shaft 2. Otherwise the construction and operation are the same as shown and described in connection with Figs. 1 to 7 and 10 to 14 and the same reference numerals have been applied to like parts.

In the pressure means 59 as shown in FIGS. 8 and 9 I eliminate the bracket 32 and the vertically and horizontally disposed sleeves 28 and 37, with their respective spring pressed plungers 25 and 26, which are mounted in fixed positions in the bracket 32. And in their stead I substitute a single sleeve 60 and spring pressed plunger 61, similar to the sleeves 28 and 37 and plungers 25 and 26, which are disposed at an angle between the vertical and horizontal and are adapted to be adjusted back and forth between vertical and horizontal positions. The sleeve 60 is adjustably mounted in a threaded aperture in a block 62 with the plunger 61 disposed in the groove 24 in cap 12. The block 62 is secured to and between the upper ends of a pair of spaced similar arms 63, the lower ends of which are provided with arcuate hooks 64 which rotatably engage under the semicircular extensions 9 at each end of the block 8. The spring pressed plunger 61 will therefore yieldingly exert both a downward and a lateral pressure upon the cap 12. When the pressure means 59 is in the position shown in FIG. 9 the downward and lateral pressures exerted against the cap 12 are equal. By adjusting the pressure means 59 counterclockwise from the position shown in FIG. 9 the downward pressure is increased and the lateral pressure is correspondingly decreased; and by adjusting the pressure means 59 clockwise from the position shown in FIG. 9 the lateral pressure is increased and the downward pressure is correspondingly decreased.

From the foregoing it will be apparent to those skilled in this art that I have provided a very simple and efficient means for accomplishing the objects of the invention, and it is to be understood that I am not limited to the specific construction shown described herein, as various modifications may be made therein within the spirit of the invention and the scope of the appended claims.

What is claimed is:

1. An air bearing of the character described comprising a high-speed rotary shaft having a cylindrical bearing surface, a base plate, a journal box in which said shaft is rotatably mounted; said journal box comprising a bearing block secured to said base plate and a bearing cap which is mounted on said bearing block for vertical and transverse floating movement with respect thereto, said bearing block and said bearing cap being each provided with opposed similar semicircular bearing surfaces which are disposed about the said cylindrical shaft bearing surface, the radii of said bearing block and said bearing cap semicircular bearing surfaces being slightly greater than the radius of said cylindrical shaft bearing surface to thereby provide a clearance space about said cylindrical shaft bearing surface, and pressure means by which said bearing cap is yieldingly biased downwardly and transversely with respect to said bearing block and said shaft, whereby said bearing cap may be moved vertically and/or transversely against said pressure means by the pressure of the air drawn into said clearance space by the rotation of said shaft.

2. An air bearing of the character described comprising a high-speed rotary shaft having a cylindrical bearing surface, a base plate, a journal box in which said shaft is rotatably mounted; said journal box comprising a bearing block secured to said base plate and a bearing cap which is mounted on said bearing block for vertical and transverse floating movement with respect thereto, said bearing block and said bearing cap being each provided with opposed similar semicircular bearing surfaces which are disposed about the said cylindrical shaft bearing surface, the radii of said bearing block and said bearing cap semicircular bearing surfaces being slightly greater than the radius of said cylindrical shaft bearing surface to thereby provide a clearance space about said cylindrical shaft bearing surface, a bracket secured in fixed position to said base plate, a vertically disposed plunger carried by said bracket in position to exert a downward pressure only on said bearing cap, and a horizontally disposed plunger carried by said bracket in position to exert a lateral pressure only on said bearing cap, by which said bearing cap is yieldingly biased downwardly and transversely with respect to said bearing block and said shaft, whereby said bearing cap may be moved vertically and/or transversely against said pressure means by the pressure of the air drawn into said clearance space by the rotation of said shaft.

3. An air bearing of the character described comprising a high-speed rotary shaft having a cylindrical bearing surface, a base plate, a journal box in which said shaft is rotatably mounted; said journal box comprising a bearing block secured to said base plate and a bearing cap which is mounted on said bearing block for vertical and transverse floating movement with respect thereto, said bearing block and said bearing cap being each provided with opposed similar semicircular bearing surfaces which are disposed about the said cylindrical shaft bearing surface, the radii of said bearing block and said bearing cap semicircular bearing surfaces being slightly greater than the radius of said cylindrical shaft bearing surface to thereby provide a clearance space about said cylindrical shaft bearing surface, bracket means pivotally mounted on said bearing block for angular adjustment, and a plunger carried by said bracket means in position to exert both a downward pressure and a lateral pressure against said bearing cap, by which said bearing cap is yieldingly biased downwardly and transversely with respect to said bearing block and said shaft, whereby said bearing cap may be moved vertically and/or transversely against said pressure means by the pressure of the air drawn into said clearance space by the rotation of said shaft.

References Cited in the file of this patent

UNITED STATES PATENTS

| 2,093,521 | Howarth | Sept. 21, 1937 |
| 2,511,543 | Rawlins | June 13, 1950 |